United States Patent
Calvignac et al.

(10) Patent No.: US 7,995,472 B2
(45) Date of Patent: *Aug. 9, 2011

(54) FLEXIBLE NETWORK PROCESSOR SCHEDULER AND DATA FLOW

(75) Inventors: Jean L. Calvignac, Raleigh, NC (US);
Chih-jen Chang, Apex, NC (US);
Joseph F. Logan, Raleigh, NC (US);
Fabrice J. Verplanken, La Gaude (FR);
Daniel Wind, Drap (FR)

(73) Assignee: International Business Machines Corporation, Armonk, NY (US)

( * ) Notice: Subject to any disclaimer, the term of this patent is extended or adjusted under 35 U.S.C. 154(b) by 80 days.

This patent is subject to a terminal disclaimer.

(21) Appl. No.: 12/348,938

(22) Filed: Jan. 6, 2009

(65) Prior Publication Data

US 2009/0175275 A1 Jul. 9, 2009

Related U.S. Application Data

(63) Continuation of application No. 11/133,477, filed on May 18, 2005, now Pat. No. 7,483,429.

(51) Int. Cl.
*G01R 31/08* (2006.01)
*H04L 12/28* (2006.01)
*H04L 12/54* (2006.01)
(52) U.S. Cl. .................. 370/230; 370/392; 370/428
(58) Field of Classification Search .............. None
See application file for complete search history.

(56) References Cited

U.S. PATENT DOCUMENTS

| | | | |
|---|---|---|---|
| 4,525,830 A | 6/1985 | Cohen et al. | |
| 6,049,600 A | 4/2000 | Nabket et al. | |
| 6,404,752 B1 | 6/2002 | Allen, Jr. et al. | |
| 6,411,684 B1 | 6/2002 | Cohn et al. | |
| 7,100,020 B1 | 8/2006 | Brightman et al. | |
| 7,385,984 B2 * | 6/2008 | Parker et al. | 370/392 |
| 7,583,678 B1 * | 9/2009 | Levy et al. | 370/395.4 |
| 2002/0191642 A1 * | 12/2002 | Calvignac et al. | 370/474 |
| 2003/0110339 A1 * | 6/2003 | Calvignac et al. | 710/305 |
| 2004/0064589 A1 * | 4/2004 | Boucher et al. | 709/250 |

* cited by examiner

*Primary Examiner* — Daniel J Ryman
*Assistant Examiner* — John Blanton
(74) *Attorney, Agent, or Firm* — Patrick J. Daugherty; Driggs, Hogg, Daugherty & Del Zoppo Co., LPA

(57) ABSTRACT

A network processor dataflow chip and method for flexible dataflow are provided. The dataflow chip comprises a plurality of on-chip data transmission and scheduling circuit structures. The data transmission and scheduling circuit structures are selected responsive to indicators. Data transmission circuit structures may comprise selectable frame processing and data transmission functions. Selectable frame processing may comprise cut and paste, full dispatch and store and dispatch frame processing. Scheduling functions include full internal scheduling, calendar scheduling in communication with an external scheduler, and external calendar scheduling. In another aspect of the present invention, data transmission functions may comprise low latency and normal latency external processor interfaces for selectively providing privileged access to dataflow chip resources.

15 Claims, 6 Drawing Sheets

FLEXIBLE NETWORK PROCESSOR SCHEDULER AND DATA FLOW

CROSS-REFERENCE TO RELATED APPLICATION

This application is a continuation of U.S. application Ser. No. 11/133,477, filed May 18, 2005.

FIELD OF THE INVENTION

The present invention generally relates to network processor structures and to communications on a network by a network processor and, more particularly, to novel data path and network processor interface structures that enable novel flexible data movement and scheduling capabilities.

BACKGROUND OF THE INVENTION

This invention relates to communication network apparatus such as is used to link together information handling systems or computers of various types and capabilities and to components of such apparatus. In particular, this invention relates to scalable network processor apparatus and components useful in assembling such apparatus. The description which follows presupposes knowledge of network data communications and switches and routers as used in such communications networks. For assistance in understanding the inventions here described, the following prior disclosure is relevant to the description which follows and is hereby incorporated by reference into this description as fully as if here repeated in full: U.S. Pat. No. 6,404,752 to Allen, Jr., et al., issued Jun. 11, 2002 for "Network Switch Using Network Processor and Methods."

Typical prior art network processor data flow structures, such as those described in U.S. Pat. No. 6,404,752 incorporated above, include "fixed function placement" structural implementations that are necessarily limiting to overall system functionality and capacity. More specifically, the design of the prior art system structure can generally function in only one predefined frame processing mode. For example, a dataflow structure designed with a "store and dispatch" mode (wherein a packet header must be copied and dispatched for packet processing) is generally desirable for network processor systems that anticipate large accumulations of data in input queue structures.

However, this type of frame processing mode is not optimal where input queues have limited growth potential. A dataflow chip using a "cut and paste" frame processing mode (wherein a frame header may be forwarded immediately to a processing unit while the body of a frame is received in a data store component, and after processing the modified header reconnected to the body in data store) would be more appropriate in this case. Furthermore, for deep packet processing system requirements, a "full dispatch" frame processing mode, also known as "pipelined frame processing" (wherein a full frame is forwarded immediately to a processing unit without being received in data store, and after processing the full modified frame is written in data store) is preferred to optimize data store bandwidth.

And where a "scheduler" structure is provided, the dataflow chip designer must choose either to provide an on-chip internal scheduler structure, which must then accordingly be limited to providing simple scheduling functions, or provide for a port connection to a separate external dedicated hardware structure or an external scheduling software interface when more robust and complex scheduling functions are required or anticipated. Specifically, an embedded ingress scheduler has inherently fixed functionality and limited capacity in terms of data flow quantities. Although simple scheduling functions may be accomplished in prior art network processor devices with embedded hardware or software schedulers, complex scheduling functions typically require connection and interface to an external hardware scheduler structure. And where "scheduler" functions are instead accomplished through software environments, additional processor cycles are required to perform the scheduling functions, resulting in reduced efficiency and system speed.

Therefore, prior dataflow structures do not afford flexibility to the end-user with regard to frame processing modes or scheduler requirements; the resultant dataflow structure is only appropriate for one type of frame processing mode, and/or one type of scheduler structure and, accordingly, system design flexibility or multiple possibilities are greatly reduced or even absent with respect to prior art dataflow structures.

Prior art network processor dataflow structures also typically require limited designated predefined interface structures such as SPI4.2 links, NPF SI switches and NPF LA1 coprocessor interfaces. Accordingly, the number of system configurations possible for any given dataflow structure is constrained by the limited flexibility of its interface structures. Direct connection to external coprocessors, and segmentation and reassembly are typically not supported, and software has limited access to data and data structures.

The aforementioned prior art systems cannot adequately meet the increased demands arising for network processing systems, such as 10 GB per second and higher media speed performance requirements combined with software flexibility. What is needed is a network processor system and method that provides for flexible and multiple alternative frame processing modes to enable efficient data processing, full complex scheduling functions without requiring external components, and superior data transmission capabilities including direct data transmission from external coprocessors, segmentation and data transmission driven by software, and direct access by software to data and data structures, as demanded and required by end-use system requirements. What is also desired is the ability for a dataflow structure to selectively meet multiple frame processing, scheduling and interface requirements as determined and selected by an end-user.

SUMMARY OF THE INVENTION

A network processor dataflow chip and method for flexible dataflow are provided. The dataflow chip comprises a plurality of on-chip data transmission and scheduling circuit structures. The data transmission and scheduling circuit structures are selected responsive to indicators. Data transmission circuit structures may comprise selectable frame processing and data transmission functions. Selectable frame processing may comprise cut and paste, full dispatch and store and dispatch frame processing. Scheduling functions include full internal scheduling, calendar scheduling in communication with an external scheduler, and external calendar scheduling. In another aspect of the present invention, data transmission functions may comprise low latency and normal latency external processor interfaces for selectively providing privileged access to dataflow chip resources.

DESCRIPTION OF EMBODIMENTS OF THE INVENTION

The present invention provides for new and novel structures defined in data path and interface areas of network processor structures that supply flexible data movement and scheduling capabilities. Scheduling flexibility is accomplished through the provision of several elementary scheduling functions. Data movement flexibility is accomplished through novel structures, such as a "second port" that enables connection to external media or coprocessor structures.

Figure 1:
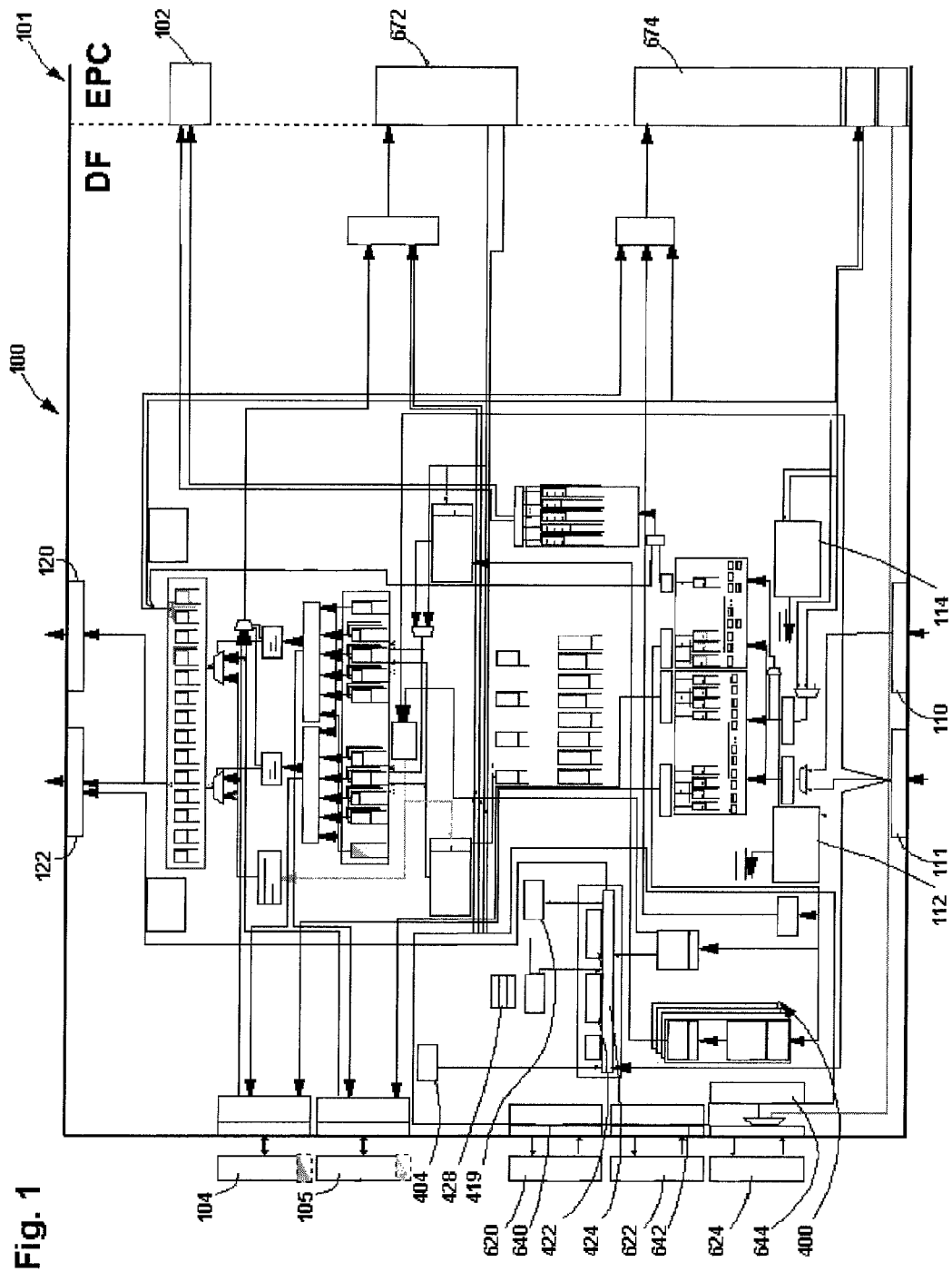
FIG. 1 is a plan diagrammatic view of a dataflow chip structure according to the present invention.

Referring now to FIG. 1, a dataflow chip (DF) 100 and embedded processor chip (EPC) 101 structure according to the present invention are illustrated. As is well known in the art, the dataflow chip 100 and embedded processor chip 101 are component parts of a larger network processor logical structure and architecture. Also as is well known in the art, dataflow chips are designed to move data through the system, receiving data packets from a network line or switch in transmitting those data packets to another network line or switch. The dataflow chip also typically interfaces with an external memory structure which holds the data packets in a queue structure before they can be transmitted. When the packets are transmitted, the dataflow chip structure reads the packets from the memory structure and sends the packets to the outgoing link

Configurable Frame Processing Modes

What is new in the present invention is the "configurable frame processing mode" functionality provided by the dataflow chip 100. In the present embodiment, three separate frame processing modes are enabled by the same dataflow chip 100: (a) cut and paste, (b) full dispatch, and (c) store and dispatch modes. Thus, an end-user may select which of these three frame processing modes are most appropriate for his particular system requirements, and the singular dataflow chip structure 100 may be programmed by the user to select any one of the three modes needed. In another aspect of the invention, the frame processing mode may be selected by dataflow management software interface with the dataflow chip 100.

In the present embodiment, the choice of frame processing mode is made by selecting an appropriate ingress port channel to the dataflow structure 100. The BUS 1 ingress port 110 represents a physical interface connection to an external chip or external network link or line, and may be channelized. In one embodiment of the present invention, 16 channels are supported at the BUS 1 ingress port 110. In another embodiment, 64 channel connections are supported. However, it should be understood that the specific number of channels supported is not limited to the embodiments described herein, and more or less channels may be supported by the ingress port according to the present invention. One skilled in the art will realize that the choice of 16 or 64 channels by the embodiments described thus far is not limiting to the invention described herein.

The channels are each designated for one of the three dispatch modes, and the system designer or data management software accordingly selects the channel based upon the desired dispatch mode. And then responsive to the appropriate channel selection in the BUS 1 110 control logic residing in the RCV PCB frame receive control block module 112 will select the appropriate dispatch structures and mode on the dataflow chip 100.

The control block module 112 comprises a plurality of port control blocks for data frame management. In the present embodiment, one port control block is provided within the control block module 112 for each channel in the BUS 1 frame switch ingress port 110 and the BUS 2 scheduler FPGA/coprocessor ingress port 111. For example, if BUS 110 and BUS 111 each have 16 channels, then the control block module 112 has 32 port control blocks. As is well known in the art, each port control block will thus control the data management on a data packet received at the appropriate ingress port 110 or 111 until the data packet is transmitted out of the dataflow chip 100.

In the present embodiment, the appropriate frame processing mode for any given data packet is indicated by bit information within the port control block. For example, for an eight or 16-bit size data port control packet for a given data frame, two bits of information would be reserved for indicating the appropriate dispatch mode, and the logic residing in the control block module 112 selects the appropriate dispatch mode for the data frame responsive to the two bits.

The EPC control block module 114 has a similar structure and function as the control block module 112, but with respect to data received from the embedded processor chip 101 instead of through the BUS 110 and 111. Therefore, it also comprises a plurality of port control blocks for data frame management for data packets received from the EPC and transmitted out of the dataflow chip 100.

In another aspect of the present invention, the dataflow chip structure 100 provides ingress and egress data flow functions, where ingress data flow is defined as handling traffic from an external network through an external switch or network node that interconnects several data flow chips within a system, and egress data flow is defined as handling traffic to an external switch. Accordingly, egress BUS ports 120 and 122 are provided to interface to external switches and frame/scheduler FPGA/coprocessor interfaces, respectively.

Figure 2:
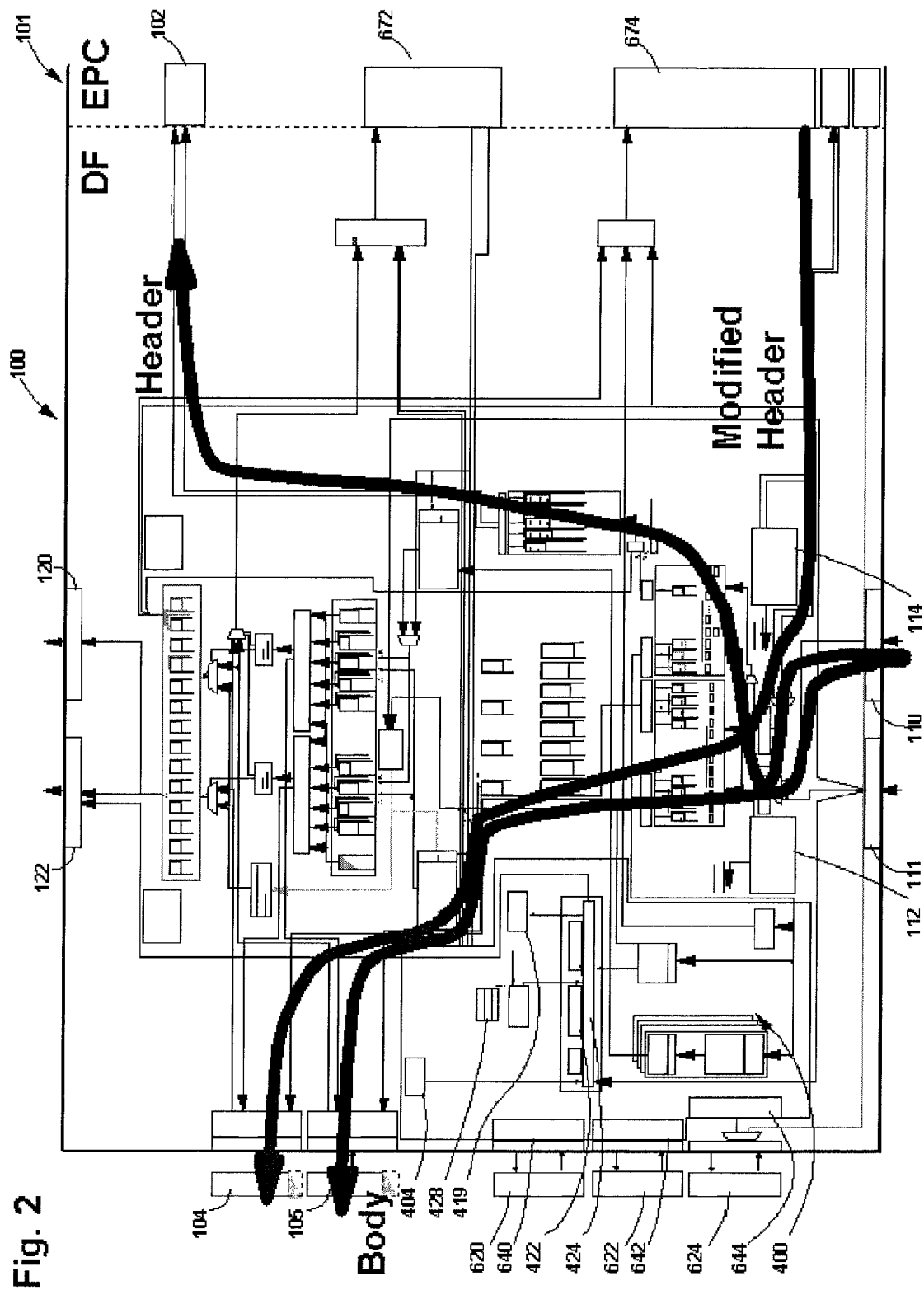
FIG. 2 is the dataflow chip structure illustrated in FIG. 1 with additional informational indicators.

Cut and paste. As illustrated in FIG. 2, in cut-and-paste mode, a frame header may be forwarded immediately to a processing unit 102 while the body of a frame is received in a data store component 104. After processing, the modified header is reconnected to the body in data store 104. In this way, the present invention optimizes data store bandwidth in systems for which input queue has limited growth.

Figure 3:
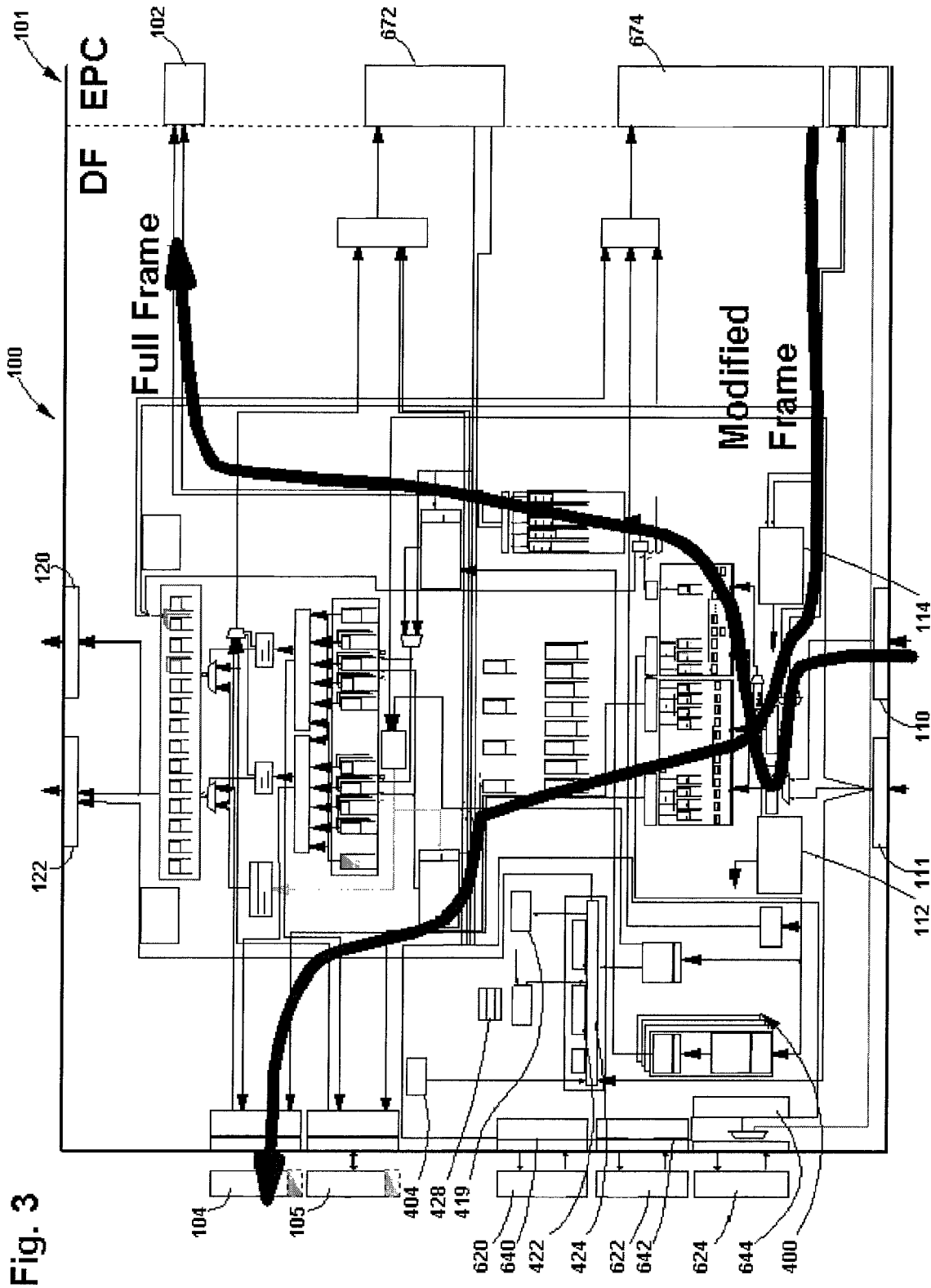
FIG. 3 is the dataflow chip structure illustrated in FIG. 1 with additional informational indicators.

Full dispatch. Referring now to FIG. 3, in full dispatch mode, a full frame is forwarded immediately to the processing unit 102 without being received in data store 104. After processing, the full modified frame is written in data store 104. In this way, the present invention optimizes data store bandwidth for systems oriented to deep packet processing.

Figure 4:
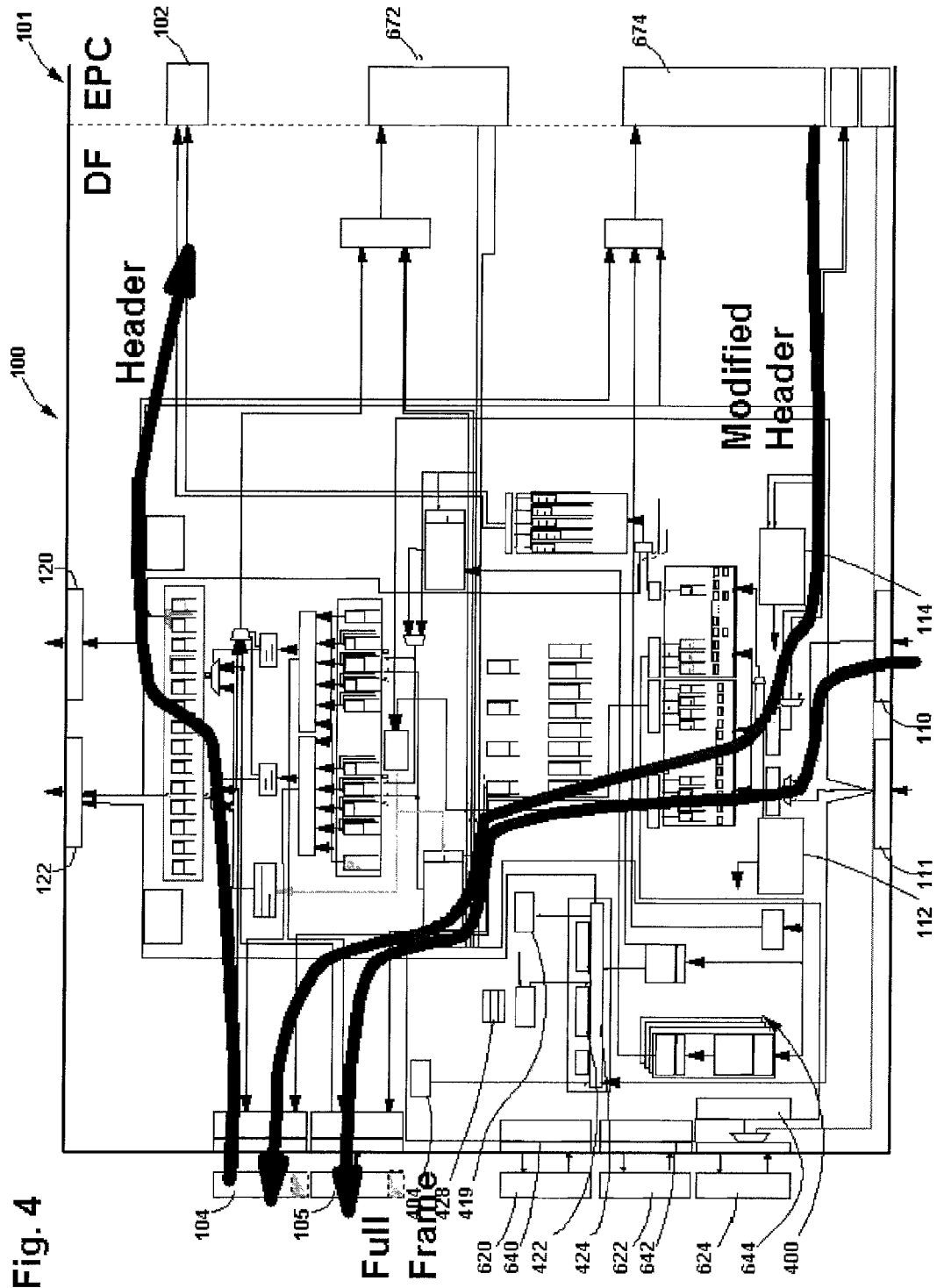
FIG. 4 is the dataflow chip structure illustrated in FIG. 1 with additional informational indicators.

Store and dispatch. Referring now to FIG. 4, the store and dispatch mode of frame processing according to the present invention is illustrated. Here a full frame is received in data store 104 and a frame header is dispatched to the processing unit number 102. After processing, the modified frame header is written back in data store for 104, replacing the original frame header. In this way, the present invention enables accommodation of very large accumulations of data in input queues.

Scheduling Modes

Figure 5:
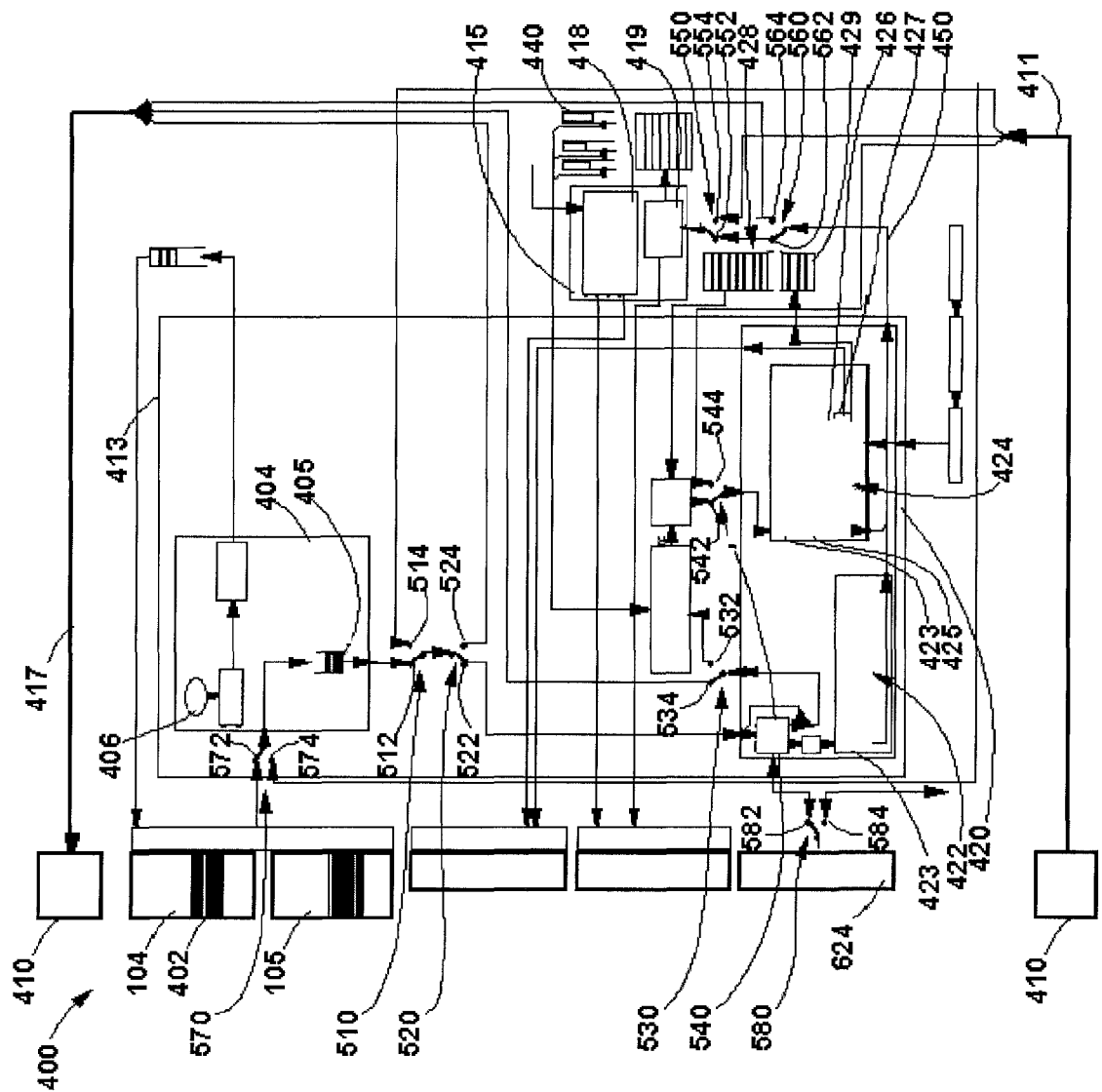
FIG. 5 is a detailed view of some of the components of the dataflow chip structure illustrated in FIG. 1.

In another aspect of the present invention, a number of alternative scheduling modes are enabled by scheduling chip structures 400 implemented in the dataflow chip 100. FIG. 5 provides a detailed view of the scheduling chip structures 400. In the present embodiment, the scheduling chip structures 400 are incorporated on the same circuit board or physical structure of the dataflow chip 100 and embedded processor chip 101, although it is apparent that they may reside on separate chips and be interconnected through wiring or other circuit structures. In the present embodiment, three different scheduling modes are available: (i) full internal scheduling functions performed in the dataflow chip structure 100; (ii) calendar in an external scheduler, and (iii) external full-scale functions, including external FPGA, ASIC and external processor scheduler functions.

Is well known in the art to provide scheduling functions within dataflow chip structures through "calendar" structures to decide which packets are to be scheduled first for dispatch. The calendar structures also manage queue control blocks (QCB's) for management of the order of queue access and flow of data from output queues from which a packet is being dequeued, as well as transmission to "target channel queues" (TCQ's). TCQ's are utilized for data packets that are being forwarded to a target channel or port. Therefore, the scheduler structures provide calendar functions and QCB manipulation functions.

Full internal scheduling function ("Scheduling Mode 1"). In the first available scheduling mode, full scheduling functions may be provided internally by the scheduler chip 400 structures and the logic residing therein. In this mode, no external scheduling structures or logic are required. The calendar and QCB control functions are driven by the dataflow chip 100, and the actual calendar structures are dedicated physical memory areas 402 located in the data store blocks 104. The dedicated calendar memory areas 402 are reserved for calendar functions. They do not handle actual data traffic and thus do not buffer or store the data packets being handled by the dataflow chip 100, but instead hold scheduling calendar data. The "dequeue" data flow functions are generally contained and defined by the dequeue chip structures and logic 411, and the enqueue dataflow functions are generally contained and defined by the enqueue chip structures and logic 415 structures, which, in turn, comprises an enqueue flow queue module 418 and enqueue TCQ module 419.

The full internal scheduling function also comprehends internal flow queue control and flow QCB management through internal structures, for both full internal and external scheduling moments. Full scheduling functions on the dataflow chip 100 are intended to be on a small-scale, thereby minimizing the number of calendar memory areas 402 dedicated to the calendar structure in the data store 104, since this dedication necessarily reduces the amount of data store 104 memory capacity for data handling. The actual number of offers required for calendar memory areas 402 is determined by the size of bandwidth handled by the dataflow chip 100, and also determined by the speed of the particular memory structures used in the data store areas 104. Accordingly, the faster the memory structures, the smaller the calendar memory area 402 bandwidth requirements.

The logic for the internal calendar functions resides in the "Flat Cal Page Loader" module 404. The process takes place in real-time, as indicated by the "Tick" clock element 406. For each time tick, an entire "Page" of calendar entries is read. In one embodiment of the invention, each calendar Page has eight calendar entries, each entry being 32 bits large.

The dataflow chip scheduler structure 400 provides further efficiency advantages within the scheduling function by providing two different scheduling procedures: (1) "guaranteed" bandwidth, and (2) "Best effort" scheduling, without the requirement of external components. As is well known in the art, guaranteed and best effort scheduling represent two different levels of scheduling commitment. In guaranteed modes, it is intended that all data will be transmitted; this type of mode is generally desirable for multimedia and voice data traffic. A "reserved bandwidth" is provided within system resources in order to enable the scheduling of each anticipated flow in the anticipated packet size. In contrast, in best effort modes, the system makes available bandwidth left over from guaranteed traffic requirements to make an attempt to transmit all data, but if too many demands are made upon system resources, some data might be dropped. The logic for controlling the guaranteed bandwidth and best effort scheduling is contained in the "flow QCB handler" 420. The logic for guaranteed bandwidth scheduling is provided by the "red flow QCB handler" 422, and includes typical guaranteed bandwidth scheduling steps 423, such as a first step of "credit accumulation bandwidth scheduling" to determine packet transmission order; then the packets are transmitted and flow queues "dequeued" according to the determination made in the credit accumulation step, and lastly the dequeue counter management step is performed to make sure that the correct number of packets have been transmitted.

The logic for best effort bandwidth scheduling is provided by the "blue flow QCB handler" 424. In the present embodiment in best effort flow, QCB handler 424 includes the aforementioned guaranteed bandwidth scheduling steps 423, and further includes weighting best effort logic steps 425. In some embodiments of the present invention, best effort decisions incorporate "round-robin" packet dispatching, wherein the remainder of the bandwidth available for packet dispatching after guaranteed bandwidth allocations is managed on a "last in-first out" (LIFO) basis.

The present embodiment provides a modified round-robin LIFO approach by giving reference to some data packets over other data packets. Accordingly, "blue weight accumulation" and "green weight accumulation" logic steps 425 are performed, in which 16 shallow calendar 4-LIFO's 428 scheduling structures are configured wherein three calendar entries are pointing to a LIFO-linked list of QCB's associated with flows that did not exceed their maximum rate, and the fourth entry points to a LIFO of QCB's associated with flows that exceeded their maximum rate.

Calendar in external scheduler, flow queue handling in dataflow ("Scheduling Mode 2"). The dataflow chip 100 also provides a second scheduling mode wherein an external scheduling chip 410 handles more complex scheduling functions, such as for example hierarchical scheduling, while still providing internal flow queue control and flow QCB management by the scheduler chip 400 internal structures. Hierarchical scheduling is a very important feature in some networks, particularly in wide-area networks, in which the network structure itself relies on some form of hierarchical of links. However, hierarchical scheduling functions are relatively complex and require more system resources than can be efficiently allocated from on-chip structures. For example, in a two-level hierarchy, with multiple virtual channels (VCs) in a single virtual path (VP), regular scheduling functions have to be performed on a VP (thereby managing the aggregate bandwidth of this VP), and also on each of the VCs multiplexed in the VP. This means that at a given point in time, a VP should be provided with some amount of best effort bandwidth available on a physical port (for example, a 100 Mbps physical port) shared with other VPs, and also shared between the VCs of the VP according to their relative "fair share" of the 100 Mbps bandwidth.

Hierarchical scheduling, therefore, may require more system resources for calendar functions than can be efficiently allocated from on-chip resources and, accordingly, an external scheduling chip 410 may be required. This is necessary in order to provide capabilities to review more than one calendar Page at a time for any given data packet scheduling function. Rather than looking at only one calendar Page and scheduling accordingly, the present invention looks at multiple pages and considers their hierarchy weightings and determines which pages have higher importance and should be scheduled first over lesser important pages for each data packet. For example, in a four-level hierarchical scheme, for each packet transmission, rather than reading just one calendar page, the present invention considers four calendar pages, wherein each calendar page is needed to manage the bandwidth of a level in the hierarchy of the network. And, accordingly, where the dataflow logic recognizes and applies best effort scheduling to this four-level hierarchical scheme data packet, and system resources are limited, then the best effort configuration will give priority to be highest ranked of the four hierarchy level packet categories and where packets must be dropped due to limited resources, then the present invention will drop the lowest hierarchy of levels first.

Full external scheduling and flow queue management ("Scheduling Mode 3"). In the third option provided by the present embodiment of the invention, full scheduling functions and flow queue management functions are performed by an external structure. The number of scheduled flows is defined by the size of control memory supported by the external scheduler, which obviously can be as large as desired, without any dataflow chip 100 structural restrictions.

In the present embodiment, the external structure is a logic programmable FPGA chip 410 capable of handling complex scheduling functions. It is to be understood that "external scheduling chip" is a generic phrase, and those skilled in the art will understand the external chip may be embodied by any number of external structures. Exemplary alternative embodiments many use other structures, such as ASIC fixed-logic chip structures, high-speed processors such as pico-processors, or other coprocessor structures. One skilled in the art will recognize that the specific nature of the external chip component 410 is not critical to the invention. What is important is that the external chip component 410 has the ability to perform the scheduling and flow queue control management functions required by the dataflow chip 100. Also of importance is that the external scheduling chip 410 has the capacity to support a much larger number of data flows and, accordingly, a much larger number of flow queues, relative to the dataflow chip 100 capacities.

Each "flow queue" is to be understood as corresponding to each logical flow that the network processor is handling. It is a list of packets that must be maintained by descriptors or data control blocks. Each control block is defined for each flow queue, wherein the control block contains data information, including a pointer to point to the first packet in a queue, another pointer to point to the last packet in a queue, and a queue count which reflects the number of packets in the queue. Accordingly, where high-volume dataflow may require millions of flow queues and queue control blocks, more robust external scheduling structure 410 memory capacity is required to hold the MB of memory demanded.

What is new in the present invention is the ability to use the dataflow chip 100 structures to provide all three of the above described scheduling modes. This is established by providing multiple dataflow and logic paths within the dataflow chip 100, and by providing switches to select the appropriate path and logic for the scheduling mode required. The switch positions may be fixed and selected by an end-user in the initial incorporation of the dataflow chip 100 into a circuit design. Or the switches may be dynamic and subject to subsequent reprogramming, or even activation/deactivation and scheduling mode changes through on-the-fly data management processes responsive to packet recognition or changing system requirements.

FIG. 5 illustrates six switches 510, 520, 530, 540, 550 and 560 for selection of any one of the scheduling modes performed by the present embodiment. Switch 510 provides the first decision point. When switch 510 is toggled left to node 512, then calendar pages exported by the calendar page loader 404 through the prefetch stack 405 are routed directly to the internal scheduler logic and structure 420 and handled pursuant to Scheduling Mode 1. Alternatively, when switch 510 is toggled to right node 514, the pages are instead received from external scheduling chip 410 through the BUS 411 and routed through the second switch 520 for dispatching through either Scheduling Mode 2 or Scheduling Mode 3. Therefore, where scheduling functions are performed by the external scheduling chip 410 in Scheduling Mode 2 and Scheduling Mode 3, the results of the external scheduling chip 410 scheduling functions are sent back to the dataflow chip 100 for management according to the present invention.

Switch 520 provides the next decision point. When switch 520 is toggled left to node 522, then the forwarded calendar pages are managed according to either Scheduling Mode 1 or Scheduling Mode 2, and the flow queue functions are handled by the flow QCB handler 420. Alternatively, when switch 520 is toggled right to node 524, the pages are instead managed according to Scheduling Mode 3 and routed through the BUS 417 to the external scheduling chip 410.

Switches 530, 540, 550 and 560 are utilized in the present invention to select internal or external flow queue handling management. Referring now to switches 530 and 540, in another aspect of the present invention, guarantee bandwidth scheduling and best effort bandwidth scheduling may be bifurcated between the dataflow chip 100 and the external scheduling chip 410. Specifically, in the present embodiment, guaranteed bandwidth flow queue scheduling may be handled on the dataflow chip 100, while best effort flow queue scheduling may be performed by the external chip 410.

The present embodiment is designed to handle 16 target queue channels through on-chip best effort flow control. If this provides sufficient bandwidth for circuit design requirements, then the internal on-chip flow scheduling structures will be selected. Accordingly, when switch 530 is toggled right to node 532 and switch 540 toggled left to node 542, best effort flow queue scheduling is handled on the dataflow chip 100. Alternatively, if network requirements necessitate substantially more bandwidth capacity than 16 target queue channels, best effort flow queue scheduling will be handled by the additional TCQ resources residing on the external scheduling chip 410 and, accordingly, switch 530 is toggled left to node 534 and switch 540 toggled right to node 544.

In another aspect of the present invention, the flow control of the target channels are managed through the use of target control queues (TCQ's). A TCQ contains data packets dequeued from flow queues as decided by the scheduling function. Due to system inefficiencies, such as the burstiness inherent in the data traffic and management processes, scheduling decisions forced by the scheduler cannot meet the physical rates supported by each of the 16 target channels. Therefore, the data packets are enqueued in the TCQ's until they may be successfully transmitted to the target channels according to the scheduling functions.

The present embodiment provides for 16 TCQ's 440, one for each of the 16 channels. However, the 16 target channels provided by the present embodiment represent a limited channel capacity. By nature, the queues are very shallow and cannot accommodate many data packets. Accordingly, another novel aspect of the present invention is the additional flexibility of selecting internal or external TCQ queue structures and management. If the 16 TCQs 440 are sufficient to handle the anticipated flow queue handling requirements, then switch 550 is toggled left to node 552 and switch 560 is toggled left to node 562, and the on-chip internal enqueue logic structure 415 and the 16 TCQ's 440 are utilized in the flow queue scheduling.

Alternatively, if network requirements necessitate substantially more bandwidth capacity than 16 target queue channels, best effort flow queue scheduling will be handled by the additional TCQ resources residing on the external scheduling chip 410. As will be readily apparent to one skilled in the art, the external chip structure 410 may be provided with many more target channels than the 16 TCQ's 440 on chip. For example, in some applications more than 1,000 TCQ's may be provided in an external chip structure 410. Accordingly, switch 550 is toggled right to node 554 and switch 560 toggled right to node 564, and TCQ management and scheduling decisions handled by logic residing on the external chip 410.

In general, the decisions embodied by the switches 510 through 560 of the present embodiment are static decisions. They are made by the circuit design when the network systems is assembled, and are not made "on-the-fly" responsive to packet identification. However, alternative embodiments may make these switch decisions dynamically, and the present invention is not to be limited to static switch selection structures, as one skilled in the art will recognize that the modes selected may be altered dynamically through interaction with the network processing system. For example in one alternative embodiment, the internal enqueue logic structure 415 and the 16 TCQ's 440 may be selected responsive to dynamic data packet characteristics and requirement changes, and communications through the BUS lines 417 and 411, or from the on-chip flow control QCB handler 420, may dynamically change switch 550 and/or 560 settings responsive to said changes.

Accordingly, target channel information contained in a packet communicated to switch 560 from the on-chip flow control QCB handler 420 through output "FCBA BCNT TC" BUS 450 may include channel identification information as well as internal/external TCQ management selection information. Where the information indicates the address of TCQ-0 through TCQ-15, then switch 550 is toggled left to node 552 and switch 560 is toggled left to node 562 and the on-chip internal enqueue logic structure 415 and the 16 TCQ's 440 are utilized in the best effort flow queue scheduling. However, if the information instead indicates the address of TCQ-16 through TCQ-1,000, then switch 560 may responsively be toggled right to node 564 and send the packet through BUS 417 to external chip 410 logic and TCQ utilization in the best effort flow queue scheduling.

Also, the switch 550 may dynamically arbitrate between packet target channel information received at node 552 from the on-chip flow control QCB handler 420 and packet target channel information received at node 554 from the external scheduling chip 410 from BUS 411, wherein these two different information inputs may arrive simultaneously at the switch 550. A buffer structure can be provided at the node 554 bus 411 interface, and arbitration priority may be given to packets arriving from the on-chip flow control QCB handler 420 at node 552.

In another aspect of the present invention, even where external scheduling chip 410 TCQ's are selected, the internal enqueue logic structure 415 and the 16 TCQ's 440 are still utilized in best effort flow queue scheduling. The TCQ operations are the last data handling operations prior to transmission of the data by the dataflow chip 100 to its network destination. As each of the 16 multiplex channels may include as many as 128 channels, keeping the data packets on chip whenever possible by utilizing the internal enqueue logic structure 415 and the 16 TCQ's 440 provides for improved speed and inefficiencies in the data transmission process even where external chip 410 TCQ resources are required.

In further aspects of the present embodiment of the invention, calendar functions may be implemented in the EPC and then to be driven by software. This is enabled when switch 570 is toggled down to node 574. And switch 580 enables the configuration of the Q2 QDR memory 624 as a repository for additional FCBs (when switch 580 is toggled up to node 582), or alternatively enables the use of the Q2 QDR memory 624 for network management counters (when switch 580 is toggled down to node 584). This provides a complement to the scheduling mode flexibility features according to the present invention. When flow queues are managed by the dataflow chip 100, the Q2 QDR memory 624 can be used to store additional QCBs. And when the external scheduler scheduling mode is selected, the Q2 QDR memory 624 can be used for other purposes, since an external scheduler will typically comprise its own larger memory resources enabling external storage of many QCBs.

Flexibility in Data Movement

Figure 6:
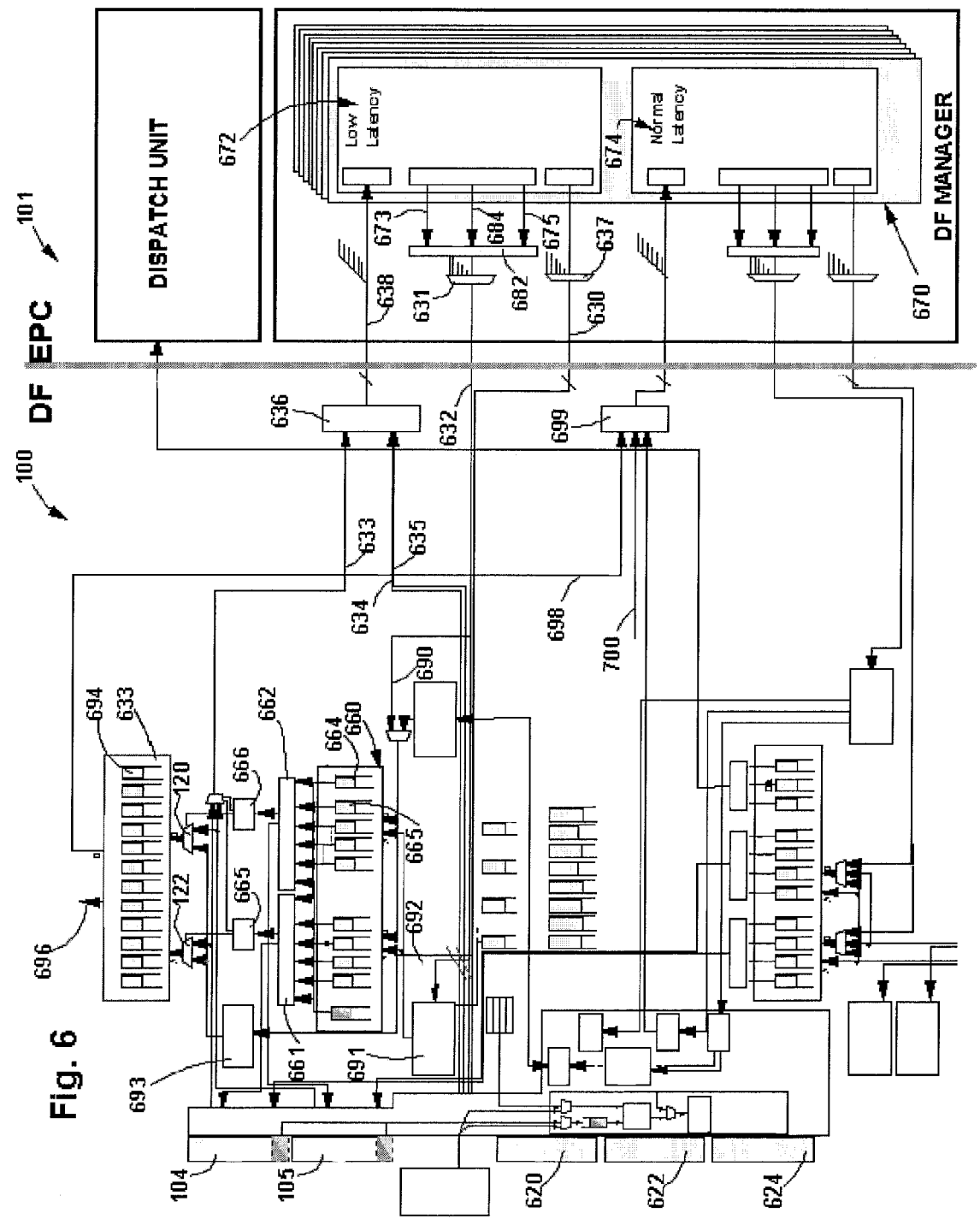
FIG. 6 is the dataflow chip structure illustrated in FIG. 1 with additional informational indicators.

The present invention also provides for improved flexibility features in data movement. Referring now to FIG. 6, aspects of flexible data movement features of the invention are illustrated with particularity in dataflow chip 100. Main data path components are configured for a plurality of frame processing modes. And alternative data path connections are provided to enable bypassing of main on-chip transmit structures for direct transmission of data from the EPC 101 to chip output ports.

EPC low latency access. In one aspect of the invention, the EPC 101 processing unit is provided with privileged high bandwidth/low latency access to control store 610 and data store 104 elements. This enables implementation by software in the EPC 101 of data movement functions such as scheduling, simulation and reassembly. In contrast, prior art implementations require hardware structures to perform scheduling, simulation and reassembly functions. Hardware implementations are necessarily static; they cannot be altered either dynamically on a packet-by-packet basis or through subsequent software reprogramming. By enabling software code to run these functions, the present invention greatly increases the flexibility of the dataflow chip 101 structures, thus enabling EPC 101 pico code processors, or the dataflow chip 101 software-defined calendar structures discussed above, to perform software-based functions that may be reprogrammed or redefined as required by changing dataflow requirements.

In the EPC low latency access mode according to the present invention, the EPC 101 is given direct access to memory resources. In prior art systems, such direct access is typically reserved for on-chip dataflow chip resources. This allows the EPC 101 complete access and ability to manipulate data packets.

In the present embodiment, QDR ("quad data rate") frame control blocks 620 and QDR buffer control blocks 622 are defined in the dataflow chip 101 for control store functions. QS0 620 is a QDR static random access memory (SRAM) component utilized in the present invention to contain frame control blocks. QS1 622 is a QDR SRAM component utilized in the present invention to contain buffer control blocks. Q2 624 is a QDR SRAM component utilized in the present invention to contain counters. What is new in the present invention is the provision of direct read/write control bus 632 and direct write data bus 692 for direct access of the buffer control blocks, frame control blocks and counters in QS1 622, QS0 620 and Q2 624, respectively, for control store data manipulation.

The software logic for enabling the direct access and manipulation of the data are found in the associated arbitration blocks. FCB QDR ARB 640 is associated with QS0 620; BCB QDR ARB 642 is associated with QS1 622; and Q2 QDR ARB 644 is associated with Q2 QDR 624. The FCB QDR ARB 640, BCB QDR ARB 642 and Q2 QDR ARB 644 are accessed by the direct control bus 632 and direct data bus 630. Direct frame control block access enables the EPC 101 to remove packets directly from dataflow chip 101 queues, or alter them or manipulate them. Direct buffer control block access enables the EPC 101 to actually split packets into smaller packets by manipulating their chain references, as will be apparent to one skilled in the art.

Data is returned to the EPC 101 through the DS direct read data component 636 through 128 bit return bus 638. The DS direct component 636 receives return data from the QDR blocks 620, 622 and 624 through QDR buses 634 and 635, and also through the DS bus 633.

As is well known in the art, "read" access latency is more important in overall system performance than "write" latency. Write operations are much simpler in that the EPC 101 may direct a write operation and thus consider the operation complete with the issuance of the instruction. In contrast, read operations require actual data manipulation and system resource commitment until the operation is complete. The present invention provides for low latency data store access by the EPC 101.

In another aspect of the present invention, an additional dataflow chip 101 access means for the EPC 101 is provided, a primitive "normal latency" EPC interface structure 674. The normal latency interface 674 allows for an additional data path into the EPC 101 from the dataflow chip 100, which enables additional system efficiencies and performance advantages.

In another aspect of the present invention, a plurality of "read request queues" (RRQ's) 660 are provided in the structure of the dataflow chip 100 itself. The RRQ's 660 contain small amounts of information necessary to identify corresponding read accesses performed on the two data store components, the DSH 104 and DSL 105, at the smallest granularity required to perform a read access on the data store components 104 and 105. Exemplary granularities would be 16 or 32 bytes for data "burst" access. Each burst read request is posted in one of the RRQ's 660. Read operations are then performed on the data store high DSH 104 as arbitrated by the DSH arbitration module 661, and on the data store low DSL 105 as arbitrated by the DSH arbitration module 662, and every data flows upward towards a plurality of transmit preparation area queues 663. This is enabled by a dedicated RRQ 664 which is reserved to provide direct read request queue functions by the EPC 101.

Data given back from the memory modules DSH 104 and DSL 105 through the read operation is intercepted and sent back directly to the EPC 101 through the DS bus 633 through the operation of control delay components 665 and 666. They function as shallow buffers that match the delay of the read operation completion, to account for the time delay between read request and actual delivery of the data requested. In order to provide for low latency, the arbitration module's 661 and 662 are given highest priority by the dedicated RRQ 664.

What is new in the present invention is that each EPC 101 processor resource 670 has a "low latency" interface 672, which provides privileged access to the dataflow chip 100 resources, and a "normal latency" non-privileged access interface 674. Low latency accesses enable control of data movement by software in scheduling, segmentation and reassembly processes. Data manipulation and transmission may occur directly from an external coprocessor allowing full access by external structures and elements to data, including the ability to change and create data in the dataflow chip datastores. Segmentation and data transmission may be driven by software. And the present invention enables direct access by software to data and data structures without requiring routing through buffering points, such as for example the data store 104.

Flexibility features are implemented by specific data paths in the dataflow chip 100. A main data path is configured by software for various frame processing modes. Internal paths are configured between the logic islands of the internal scheduler and BUS2, allowing connection of an external scheduler or coprocessor. Thus, reuse of main data path functions with additional by-passes for flexible data movement is enabled. An additional transmit data path reuses transmit control logic, but bypasses the main transmit data path from data store 104 to output ports. This enables direct transmission of data from the processing unit to output ports.

In the present embodiment of the dataflow chip 101, the selection of data movement mode is made dynamically on a packet-by-packet basis. No end-user configuration or programming is required, although it will be readily apparent to one skilled in the art that this type of option selection may be provided. As the dataflow chip 101 transmits, a data packet information within each of the data packets will cause a responsive selection of the appropriate data movement path.

Referring now to FIG. 6, a block diagram schematic of the data flow chip 100 is illustrated, providing additional detail not shown in previous views of the dataflow chip 100 illustrated in FIGS. 1 through 5. Additionally, for the sake of clarity, some elements present in FIGS. 1 through 5 are not shown in FIG. 6. It is to be understood that the dataflow chip 100 embodiment shown in FIGS. 1 through 6 includes all of the elements shown in any of the various individual figures, and if a numbered element is not found in any one view, it may be found in another.

As described above, the QS0 QDR ("quad data rate") frame control blocks 620 contain frame control blocks, the QS1 QDR buffer control blocks 622 contain buffer control blocks and Q2 QDR 624 contains counters. The software logic for enabling the direct access and manipulation of the data are found in the associated arbitration blocks FCB QDR ARB 640, BCB QDR ARB 642 and Q2 QDR ARB 644, which are accessed by the direct control bus 632 and direct data out bus 630. And as described above, direct frame control block access enables the EPC 101 to remove packets directly from dataflow chip 101 queues, or alter them or manipulate them. Direct buffer control block access enables the EPC 101 to actually split packets into smaller packets by manipulating their chain references, as will be apparent to one skilled in the art.

The direct control bus 632 is accessed by an access control MUX 631, and the direct data out bus 630 is accessed by a data out MUX 637. The data out MUX 637 and the access control MUX 631 provide interface to EPC 101 low latency data access resources wherein multiple EPC 101 processor resources 670 are provided access to each of the access control MUX 631 and data out MUX 637.

Low latency. The low latency interface 672 communicates through ACC ID 673, ADDR 684 and CTL 675 data buses with the access control MUX 631 through a low latency bus 682. The ACC ID 673 is for high level "access identification" memory address information for data access and manipulation, and address and control information for the target data is sent by the EPC 101 processor resource 670 through the ADDR 684 and CTL 675 data buses, respectively.

For data write operations, QDR direct write data is sent by the EPC 101 processor resource 670 through the arbitration blocks FCB QDR ARB 640, BCB QDR ARB 642 and Q2 QDR ARB 644 on the direct data out bus 630 through the data out MUX 637. For read operations, the read data address locations are returned to the EPC 101 processor resource 670 and data is read from the QS0 QDR frame control blocks 620 and QS1 QDR buffer control blocks 622 on the QDR direct read data buses 634 and 635, and data store data is read from the data stores 104 and 105 on the DS direct read data bus 633. Read data is transmitted from the DS direct read data bus 633 and the QDR direct read data buses 634 and 635 through a DS direct read data mux 636 to the EPC 101 processor resource 670. Thus, direct access to data store data by software is enabled for manipulation of the data stored data.

According to the present invention, two data accesses are provided. The first data access provided is "DS Direct Read". The ACC ID 673 points to the appropriate data store high 104 or data store low 105. The read request will flow from the CTL 675 data bus along the direct control bus 632 to a DS direct read control bus 690 to generate a special data store read request, which is queued in the special EPC direct read request queue 664 located in the block of read request queues 660. The EPC direct read request queue 664 is similar to the ordinary read request queues 665 located in the read request queue block 660, except for the priority granted to it by the data store high read arbitrator 661 and data store low read arbitrator 662 in accessing the data store high 104 and data store low 105, respectively. A read operation will responsibly occur on the data store high 104 and/or data store low 105, and data will return to the EPC 101 processor resource 670 on the DS direct read data bus 633.

The second data access provided is "direct transmit" data access, wherein the EPC 101 may transmit data directly through the dataflow chip 100 without the requirement of first storing the data in the data store structures 104 or 105. This is accomplished by using the ACC ID 673 to point to a specific transmit port 694 within the transmit ports block 633. The ADDR 684 bus is used to communicate with the XMT PCB structure 691 through the direct write data bus 692 to cause the XMT PCB 691 to create a "pseudo read request" that will be dequeued in the read request queues 665 in the read request queue block 660. The specific pseudo read request will be dequeued into the data store high control delay block 665 or the data store low control delay block 666, and will be recognized as a special read request that does not require read/write of the transmitted data to the data stores 104 and 105, but instead will steer the transmitted data directly to the BUS 2 (A) output port 122 or the BUS 1 (B) output port 120. In the present embodiment of the invention, data directly transmitted through the BUS 2 (A) output port 122 moves onto a framer, a scheduler FPGA or a coprocessor, and data directly transmitted through the BUS 1 (B) output port 120 moves on to a framer or a switch.

Normal latency. The present invention also provides for "normal latency", or non-privileged dataflow chip 100 access by the EPC 101. Non-privileged data store 104 and 105 read data access travels along the read more from DS bus 698 through a data-in mux 699 into a data-in bus 701 to an EPC 101 processor resource 670 through the "normal latency" interface 674. The read more from DS bus 698 is novel in that it relies completely on the normal data flow chip 100 structures described thus far but without benefiting from the low latency capabilities described above. The external software scheduler mode described above is enabled by the schedule return bus 700, which also enters the data-in mux 699.

While embodiments of the invention have been described herein, variations in the design may be made, and such variations may be apparent to those skilled in the art of computer architecture, systems and methods, as well as to those skilled in other arts. The present invention is by no means limited to the specific hardware implementations illustrated above, and other software and hardware implementations will be readily apparent to one skilled in the art. The scope of the invention, therefore, is only to be limited by the following claims.

What is claimed is:

1. A network processor dataflow chip, comprising:
a plurality of on-chip data transmission circuit structures, the on-chip data transmission circuit structures comprising a plurality of selectable frame processing circuit structures and a plurality of selectable data transmission circuit structures; and
a plurality of scheduling circuit structures, the plurality of scheduling circuit structures comprising a full internal scheduling circuit structure, a calendar scheduling circuit structure in communication with an external scheduler chip and an external calendar scheduling circuit structure;
wherein one of the plurality of data transmission circuit structures is configured to be selected responsive to a data transmission selection indicator;
wherein one of the plurality of scheduling circuit structures is configured to be selected responsive to a scheduling function selection indicator;
wherein the full internal scheduling circuit structure comprises calendar and queue control circuit structures configured to be driven by the dataflow chip, and the calendar circuit structures are each defined by a plurality of dedicated physical memory areas located in data store blocks; and
wherein the full internal scheduling circuit structure comprises logic configured for internal calendar functions residing in a calendar page loader and a clock element, and the calendar circuit structures each comprise a plurality of calendar pages, each of the plurality of calendar pages comprising a plurality of calendar entries, wherein the dataflow chip is configured to read a calendar page for each clock element tick;
the dataflow chip scheduler circuit structure further comprising a guaranteed bandwidth scheduling circuit structure and a best effort scheduling circuit structure a round-robin LIFO buffer having a plurality of memory blocks ranked from highest to lowest priority, first weight accumulation logic for best effort bandwidth scheduling, and second weight accumulation logic for best effort bandwidth scheduling; and wherein the data flow chip is configured to provide best effort dispatching by:

applying the first weight accumulation logic and the second weight accumulation logic to a data packet;

selecting a memory block and placing the data packet into the selected memory block in the LIFO buffer responsive to relative amounts of first weight and second weight characteristics, wherein packets with the higher first weight relative to the second weight and placed in higher priority memory blocks; and dropping data packets from the lowest priority memory blocks.

2. The dataflow chip of claim 1, further configured to select a frame processing circuit structure responsive to the selection of one of a plurality of ingress port channels.

3. The dataflow chip of claim 1, further configured to select a frame processing circuit structure for a data packet responsive to a bit information received within the data packet.

4. The dataflow chip of claim 1, wherein the external scheduler chip is selected from the group comprising a logic programmable FPGA chip, an ASIC fixed-logic chip, a high-speed processor, and a coprocessor.

5. The dataflow chip of claim 1, further comprising internal enqueue logic structures, wherein the internal enqueue logic structures are utilized in best effort flow queue scheduling for data packets received from the external scheduling chip.

6. The dataflow chip of claim 1, wherein the plurality of selectable frame processing circuit structures comprises:
a cut and paste frame processing circuit structure;
a full dispatch frame processing circuit structure; and
a store and dispatch frame processing circuit structure.

7. The dataflow chip of claim 6, wherein:
the cut and paste frame processing circuit structure is configured to forward a frame header immediately to a processing unit while a body of a frame is received in a data store component and, after processing the frame, then reconnect a modified header to the body in the data store;
the full dispatch frame processing circuit structure is configured to forward a full frame immediately to a processing unit without receiving the full frame in the data store and, after processing the full frame, write a full modified frame in the data store; and
the store and dispatch frame processing circuit structure is configured to receive the full frame in the data store and dispatch an original frame header to the processing unit number and, after processing the full frame, write a modified frame header back to the data store, the modified frame header replacing the original frame header.

8. The dataflow chip of claim 1, further comprising:
a plurality of dataflow and logic paths; and
a plurality of switches to select dataflow and logic paths;
wherein the scheduling circuit structure is selected responsive to positions of the plurality of switches.

9. The dataflow chip of claim 8, wherein the positions of the plurality of switches are selected dynamically responsive to data packet recognition.

10. The dataflow chip of claim 8, wherein internal or external flow queue handling management is selected responsive to a position of at least one of the plurality of switches.

11. The dataflow chip of claim 10, wherein guaranteed bandwidth flow queue scheduling is handled on the dataflow chip and best effort flow queue scheduling is performed by the external scheduler chip.

12. The dataflow chip of claim 10, wherein internal or external flow queue handling management is selected responsive to channel identification information in a data packet.

13. The dataflow chip of claim 1, wherein the plurality of on-chip data transmission circuit structures comprises:
a low latency external processor interface circuitry configured to provide privileged access to dataflow chip resources; and
a normal latency external processor interface circuitry configured to provide non-privileged access to dataflow chip resources.

14. The dataflow chip of claim 13 wherein the low latency interface is configured to enable control of data movement by software in scheduling, segmentation and reassembly processes directly from an external coprocessor.

15. The dataflow chip of claim 13 wherein the low latency interface circuitry uses normal latency interface circuitry transmit control logic but bypasses a main transmit data path from a data store to an output port.

* * * * *